No. 755,428. Patented March 22, 1904.

UNITED STATES PATENT OFFICE.

JULIUS ABEL, OF MANNHEIM, AND ARTHUR LÜTTRINGHAUS, OF LUDWIGSHAFEN-ON-THE-RHINE, GERMANY, ASSIGNORS TO THE BADISCHE ANILIN UND SODA FABRIK, OF LUDWIGSHAFEN - ON - THE - RHINE, GERMANY, A CORPORATION OF BADEN.

BLUE-SULFUR DYE AND PROCESS OF MAKING SAME.

SPECIFICATION forming part of Letters Patent No. 755,428, dated March 22, 1904.

Application filed October 17, 1902. Serial No. 127,737. (No specimens.)

*To all whom it may concern:*

Be it known that we, JULIUS ABEL, doctor of philosophy and chemist, a citizen of the free Hansa town of Hamburg, residing at Mannheim, in the Grand Duchy of Baden, and ARTHUR LÜTTRINGHAUS, doctor of philosophy and chemist, a subject of the King of Prussia, Emperor of Germany, residing at Ludwigshafen-on-the-Rhine, in the Kingdom of Bavaria, Empire of Germany, have invented new and useful Improvements in Blue Coloring-Matter and Processes of Making the Same, of which the following is a specification.

This invention has for its object the production of a new class of blue substantive coloring-matter containing sulfur, which is distinguished from all others by directly dyeing cotton from a bath containing sodium sulfid blue shades and by dissolving completely in dilute caustic-soda lye, containing about five (5) per cent. of NaOH, yielding a blue solution from which the coloring-matter is not precipitated by blowing in pure air, but from which it is precipitated by blowing in sufficient carbonic-acid gas.

To obtain our new coloring-matter, we can employ a mixture of a thiazin, such as methylene-violet, and phenol as initial material and treat this mixture under suitable conditions with sulfur and sodium sulfid or other agent acting in a similar manner. Instead of methylene-violet various bodies, which for the purposes of this invention we regard as equivalent to methylene-violet, can be employed. As instances of such, we cite the analogues of methylene-violet, alkylated indophenols—obtainable, for example, by oxidizing alkyl-paraphenylene-diamin with phenol—or a suitable derivative of an alkylated indophenol or the corresponding diphenylamin body; further, a thiosulfonic acid of said indophenol.

The following examples will serve to further illustrate the nature of our invention; but it is not confined to these examples. The parts are by weight.

Example 1: Heat in an open vessel provided with a stirrer two hundred and forty (240) parts of crystallized sodium sulfid until the temperature of the molten mass is about one hundred and thirty-six degrees centigrade, (136° C.) Then add quickly thereto eighty-five (85) parts of phenol, sixty (60) parts of methylene-violet, and sixty (60) parts of sulfur. From this mixture distil off a mixture of phenol and water until the inner temperature of the whole has risen to about one hundred and forty-two degrees centigrade, (142° C.,) and when this temperature is reached connect the vessel with a reflux arrangement and heat at the said temperature until the methylene-violet has been completely or almost completely used up. In from two (2) to two and one-half (2½) hours the formation of the substantive coloring-matter or its leuco compound, respectively, is complete. Add to the whole about two thousand (2,000) parts of boiling water and filter from insoluble matter and pass air through the filtrate until all the leuco compound is oxidized. Heat the solution and precipitate the coloring-matter from it by the addition of about one hundred and fifty (150) parts of common salt. When cold, filter, press, and dry. The coloring-matter thus obtained can be employed for directly dyeing cotton from a bath containing alkali sulfid and common salt. The dyeing can be effected at ordinary temperature or at higher temperatures. The direct dyeings are of excellent fastness, which can be further increased by treatment with copper sulfate and acetic acid.

Example 2: Introduce one hundred and twenty (120) parts of crystallized sodium sulfid and thirty (30) parts of phenol sodium into a reflux apparatus provided with a stirring arrangement and heated by means of an oil-bath, and heat the mixture to a temperature of about one hundred degrees centigrade, (100° C.,) and then add thereto twenty-five (25) parts of alkylated indophenol (prepared by oxidizing together dimethyl-para-phenylene-diamin with phenol.) When the indophenol has gone into solution, add twenty-five (25) parts of sulfur. Then raise the temperature of the reacting mixture, so that it boils at about one hundred and twenty-five degrees centigrade, (125° C.,) which can, if necessary, be effected by boiling off part of the water of crystallization of the sodium sulfid, and maintain this temperature for the remainder of the process. The sulfurization is, as a rule, complete in about thirty (30) hours. To effect the isolation of the coloring-matter, add hot water to the melt and filter from any insoluble matter present and oxidize the filtrate by blowing air through it. Then heat the solution to boiling and salt out the coloring-matter by means of common salt. The coloring-matter is easily soluble in dilute caustic alkali and can be precipitated from such solutions by the addition of common salt or by means of carbon dioxid.

Example 3: Introduce one hundred and twenty (120) parts of crystallized sodium sulfid into a reflux apparatus provided with a stirrer and heated by an oil-bath, and heat the vessel while open and allow the steam to escape until the temperature of the molten sodium sulfid has risen to about from one hundred and thirty-five to one hundred and forty degrees centigrade (135°–140° C.) Then cool the mass and successively introduce fifty (50) parts of phenol, thirty (30) parts of the indophenol mentioned in the preceding Example 2, and thirty (30) parts of sulfur. Keep the reaction mixture at the boiling-point until the indophenol is completely or almost completely converted, the conversion in this case being generally completed in from three (3) to four (4) hours. The isolation of the coloring-matter can be effected as in the preceding Example 2, and the coloring-matter obtained appears to be identical with that of the said example.

In the above examples the quantity of alkali sulfid and sulfur and of the phenol employed can be varied within certain limits without essentially interfering with the result.

We claim—

1. As a new product the coloring-matter which directly dyes cotton from a bath containing sodium sulfid blue shades, and which dissolves in caustic-soda lye yielding a blue solution from which solution the coloring-matter cannot be precipitated by means of pure air, but from which it can be precipitated by means of carbonic-acid gas.

2. The process of manufacturing blue coloring-matter which consists in heating a mixture of a thiazin body and phenol with sulfur and alkali sulfid.

3. The process of manufacturing blue coloring-matter which consists in heating a mixture of methylene-violet and phenol with sulfur and alkali sulfid.

In testimony whereof we have hereunto set our hands in the presence of two subscribing witnesses.

JULIUS ABEL.
ARTHUR LÜTTRINGHAUS.

Witnesses:
   JOHN L. HEINKE,
   JACOB ADRIAN.